United States Patent [19]

Willoughby et al.

[11] Patent Number: 4,963,961

[45] Date of Patent: Oct. 16, 1990

[54] VERTICAL MOTION DETECTOR

[75] Inventors: Jon S. Willoughby, Oxford; Erik D. Perkins, Lancaster, both of Pa.

[73] Assignee: Burle Technologies, Inc., Wilmington, Del.

[21] Appl. No.: 368,378

[22] Filed: Jun. 16, 1989

[51] Int. Cl.[5] .................... H04N 7/18

[52] U.S. Cl. .................... 358/105; 358/108

[58] Field of Search .................... 358/105, 108

[56] References Cited

U.S. PATENT DOCUMENTS

| | | | |
|---|---|---|---|
| 3,988,533 | 10/1976 | Mick et al. | 358/105 |
| 4,148,062 | 4/1979 | Kamin | 358/105 |
| 4,408,224 | 10/1983 | Yoshida | 358/105 |
| 4,597,010 | 6/1986 | Carr | 358/136 |
| 4,661,846 | 4/1987 | Kondo | 358/105 |
| 4,703,358 | 10/1987 | Flannaghan | 358/167 |
| 4,731,648 | 3/1988 | Bernard | 358/105 |
| 4,766,490 | 8/1988 | Haghiri | 358/105 |
| 4,772,945 | 9/1988 | Tagawa | 358/108 |
| 4,783,833 | 11/1988 | Kawabata | 358/105 |

*Primary Examiner*—Howard W. Britton
*Assistant Examiner*—James Juo
*Attorney, Agent, or Firm*—Martin Fruitman

[57] ABSTRACT

A vertical motion detector for a TV system motion detector. The circuit operates by delaying each motion indicator signal by multiple units of the time required for one full horizontal line sweep. If vertical motion occurs, the delayed indicator will output from the delay at the same time another indicator occurs. These signals are fed to multiple AND gates so that several coincident signals are required to produce an alarm. A switching circuit permits selection of the number of vertical motion indicators required for an alarm.

6 Claims, 1 Drawing Sheet

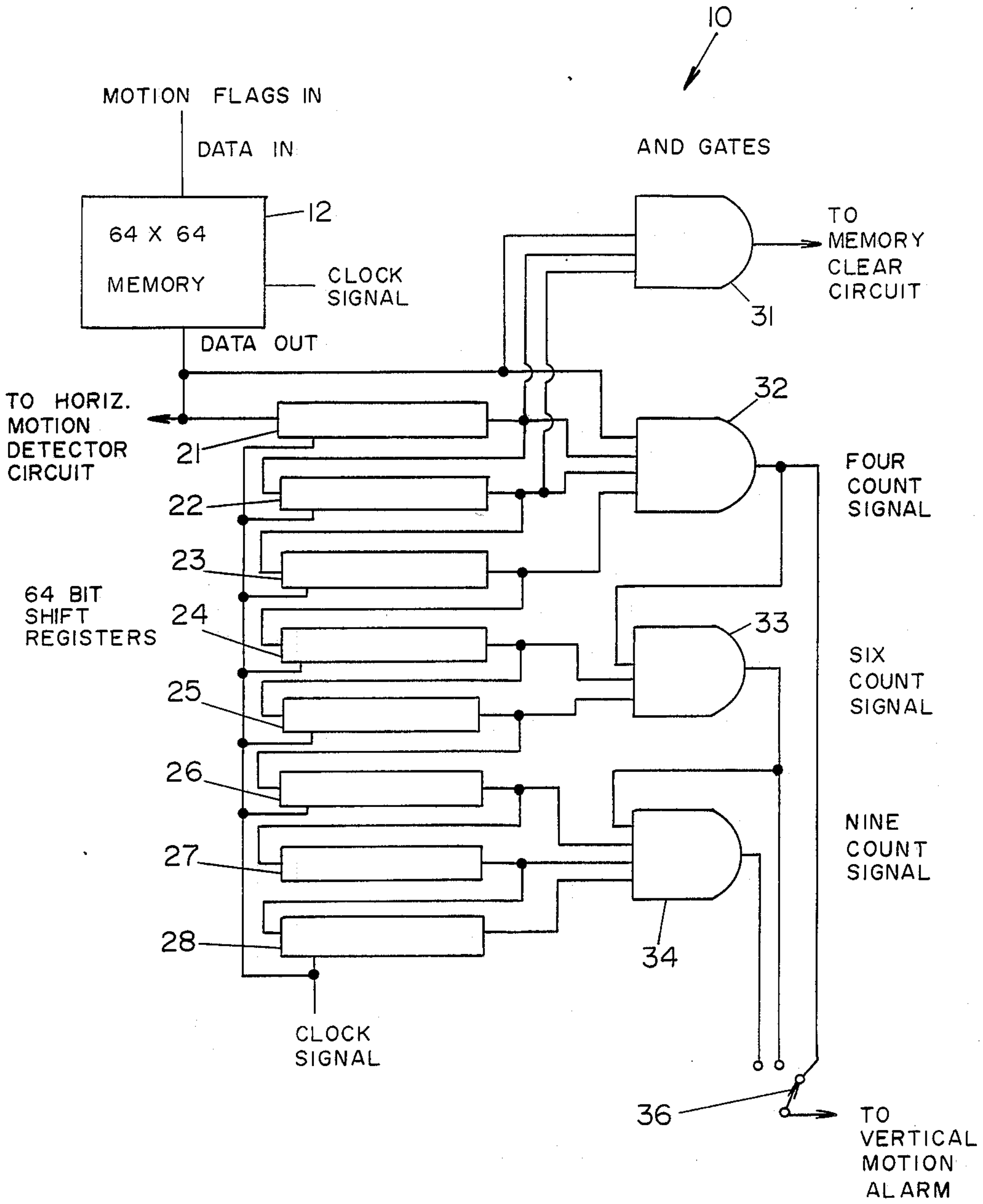
10
MOTION FLAGS IN
DATA IN
64 X 64
MEMORY
12
CLOCK SIGNAL
DATA OUT
AND GATES
TO MEMORY CLEAR CIRCUIT
31
32
TO HORIZ. MOTION DETECTOR CIRCUIT
21
22
23
24
25
26
27
28
64 BIT SHIFT REGISTERS
FOUR COUNT SIGNAL
33
SIX COUNT SIGNAL
NINE COUNT SIGNAL
34
CLOCK SIGNAL
36
TO VERTICAL MOTION ALARM

VERTICAL MOTION DETECTOR

SUMMARY OF THE INVENTION

This invention deals generally with pictorial transmission by television and more specifically with the apparatus of a vertical motion detector.

Closed circuit television systems are becoming common enough so that almost everyone has seen one or been seen upon one. Perhaps the most widely used application for such systems is security monitoring. Almost all department stores and warehouses now have such installations, and while the use of such equipment during periods of high traffic may require almost constant viewing of the monitor screens, these systems can also be used when there is no expected activity. Under such circumstances it is not only inefficient to have a person always watching the screen, but it is a very difficult task to watch the screen when there is no activity upon it.

Therefore, motion detection systems have been developed so that the screen is monitored electronically, and an alarm is activated whenever any motion is detected. This permits dramatic changes in the traditional job of the night watchman. Instead of walking from one station to another in a building, the watchman now stays in one location which contains closed circuit TV monitors upon which he can view every area in the building. This permits one person to secure an area which is much larger than was previously possible. Moreover, the motion detectors assure that the watchman need not actually be watching a particular monitor at exactly the moment when some activity occurs.

Conventional wisdom in regard to motion detectors suggests that only horizontal motion on the monitoring screen need be monitored, because intruders will move generally horizontally, and therefore little attention has been given to detecting vertical motion. However, in field use it has become apparent that many situations require not only horizontal motion detection, but also the detection of vertical motion. For instance, in outdoor areas intruders could drop down over fences, or in extreme situations remove items from above with cranes or helicopters. Furthermore, even indoors a fire in its early stages may show little horizontal motion, but will almost always indicate significant vertical motion.

The present invention furnishes a vertical motion detector for use in association with a TV motion detector which converts the normally available horizontal motion indication to a vertical motion indication. This is accomplished by recognizing that when a horizontal motion indicator is followed by another horizontal motion indicator exactly one horizontal sweep period later, there actually have been two motion indicators in vertical alignment, that is, one above the other. Clearly, that is an indication of vertical motion. The apparatus of the present invention therefore supplies a vertical motion indicator or a vertical motion alarm, based upon the time difference between horizontal motion indicators, called horizontal motion flags.

The preferred embodiment of the invention makes the task simpler by preceding the vertical motion detector by a storage memory with a 64×64 configuration into which the original horizontal motion flags are entered. The vertical motion detector then need deal only with the 64 sample horizontal lines. Thus, any horizontal motion flag which is followed by another flag 64 samples later is an indication of vertical motion. The particular number is not critical, and if the vertical motion detector were designed for a 256 bit delay, it could operate directly from the standard TV signal which has been sampled into a 256 element TV line.

In the preferred embodiment the output of the 64×64 memory is connected to a series of 64 bit shift registers. These registers are all driven by the system clock, and the outputs of the shift registers are connected to a configuration of AND gates. In the simplest situation, a horizontal motion flag is fed to the first input of the first AND gate and to the first shift register. Then it exits the shift register 64 clock pulses later and is fed to another input of the first AND gate. If, with that same 64th clock pulse, another horizontal motion flag is being fed both to the first shift register and to the first input of the AND gate, it means there has been motion detected in two vertically adjacent elements, and the AND gate properly produces an output. It is this output which is the vertical motion indicator or flag.

The preferred embodiment of the invention expands this simple configuration to include eight shift registers and four AND gates, and thereby furnishes a versatile system which can generate a vertical motion alarm based upon the operator's selection of either four, six or nine vertically adjacent motion flags.

The circuit also includes a provision for generating a signal for clearing the preceding 64×64 memory. This is desirable to prevent the accumulation of mere noise generated random flags from eventually causing an alarm.

The invention provides a simple means for attaining the vertical motion detection function from a horizontal motion detector circuit with the addition of inexpensive off-the-shelf components, thereby providing additional desirable security.

BRIEF DESCRIPTION OF THE DRAWING

The FIGURE is a simplified block diagram of the circuit of the preferred embodiment.

DETAILED DESCRIPTION OF THE INVENTION

The FIGURE shows a simplified block diagram of the preferred embodiment of the invention in which vertical motion detector 10 is assembled from 64×64 memory 12, 64 bit shift register 21 through 28, and AND gates 31 through 34.

It should be understood that the particular number 64 is not critical, but is used in the preferred embodiment because of convenience. It is used here because it is the result of dividing by four the 256 elements in each dimension of the previously sampled lines of a conventional TV horizontal raster.

The use of the 64×64 memory in the preferred embodiment means that motion in any one of 4096 sampled picture elements from a conventional TV screen will be stored within memory 12 as a motion flag in one of its memory locations. The data output of memory 12 is the continuous readout of each of its memory locations in sequence and is synchronized with the common clock signal being fed to memory 12 and shift registers 21 through 28. Essentially, the data output of memory 12 is a continuous string of information with indications of motion, motion flags, from any memory locations which have received and stored one or more motion flags. This data output is usually fed to a horizontal motion detector (not shown) which then determines if there has been a sufficient number of adjacent motion flags stored within memory 12 to warrant initiation of a motion alarm.

The circuit of the preferred embodiment converts the data output of memory 12, which is usually considered to be furnishing only horizontal motion flags, into a source of vertical motion flags. This is accomplished by feeding the data output of memory 12 to a series of shift registers 21 through 28.

STRUCTURE OF THE PREFERRED EMBODIMENT

The data output terminal of memory 12 is actually connected to the input of shift register 21 whose output is connected to the input of shift register 22. Each shift register's input is connected to the output of the preceding shift register and each shift register's output is connected to the input of the following shift register.

The shift register's outputs are also interconnected to a group of AND gates. AND gate 31 has one of each of its inputs connected to the data output of memory 12, the output of shift register 21, and the output of shift register 22.

One of each of the inputs of AND gate 32 is connected to the same points as the inputs of AND gate 31, and an additional input of AND gate 32 is connected to the output of shift register 23.

AND gate 33 has one of each of its inputs connected to the output of AND gate 32, the output of shift register 24, and the output of shift register 25.

One of each of the inputs of AND gate 34 is connected to the output of AND gate 33, the output of shift register 26, the output of shift register 27, and the output of shift register 28.

The outputs of AND gates 32, 33 and 34 are connected to switch 36 by which the operator can select the number of adjacent vertical motion flags which will activate a vertical motion alarm (not shown) to which switch 36 feeds the output signal of one of the AND gates.

The output of AND gate 32 initiates an alarm from four adjacent vertical motion flags, while the outputs of AND gates 33 and 34 initiate alarms from six and nine adjacent vertical motion flags, respectively.

OPERATION OF THE PREFERRED EMBODIMENT

To understand the operation of the invention, it should first be recognized that the output of memory 12 consists of a continuous string of information signals, some of which are horizontal motion flags. Furthermore, the nature of the readout of the TV screen samples produces a series of information signals which are related to one horizontal line, and these are immediately followed by the information related to the next lower horizontal line. It has no bearing on the operation of the invention whether each horizontal line is represented by 64 samples as in the preferred embodiment, 256 samples as would be the case if the information were taken directly from the TV screen sampled at 256 locations per line, or some other number. The only requirement, which will be better appreciated after the following description of operation, is that each shift key register have the same number of positions as the number of samples in each horizontal line.

As can be understood from the preceding description of the structure of the invention, the data output of memory 12 is fed to the input of shift register 21 and to one input of AND gate 31. Assuming a horizontal motion flag appears on the data control, it will begin to travel through shift register 21, progressing one location with each system clock signal, but it will not cause an output from AND gate 31 because when it is first fed to the AND gate, it will be the only signal on all the inputs. All of the AND gates operate conventionally in that all the inputs of any one AND gate must have signals to produce an output from that gate.

It is when the initial motion flag reaches the end of shift register 21, after 64 clock signals, and is fed to the input of shift register 22, that the circuit action is critical. If, on that same 64th clock signal, another horizontal motion flag is produced on the output of memory 12, it means that two motion flags existed one above the other in the memory or on the screen. It would theoretically be possible to activate a vertical motion alarm on such an event, but it is actually more practical to accumulate more adjacent vertical flags to prevent random noise from initiating an alarm.

The preferred embodiment of the invention therefore is designed so that the first horizontal motion flag continues through shift register 22 while the second motion flag moves through shift register 21. Then, if on the 128th clock signal, a third horizontal flag appears on the output of memory 12 all the inputs to AND gate 31 have a signal and it produces an output. While it would also be possible to initiate a vertical motion alarm at this point, it is still not done in this particular embodiment. Instead the action triggered by the output of AND gate 31 is to initiate a clear cycle for memory 12 so that mere random noise will not accumulate and cause false indications of motion.

However, the vertical motion detector continues to operate, and the existing horizontal motion flags continue to progress through each shift register in sequence. Therefore if a fourth horizontal motion flag is generated on the output of memory 12 as the first flag comes out of shift register 23, while the second flag comes out of shift register 22, and the third flag leaves shift register 21, then all the requirements to produce an output from AND gate 32 are fulfilled. If switch 36 is in the position pictured in the Figure, the vertical motion alarm will then be produced.

In the same manner, if continuing horizontal motion flags are produced on the output of memory 12 with the precise spacing of 64 clock signals between them, AND gates 33 and 34 can also be activated and they can be selected as the source of the operational signal for the vertical motion alarm circuit (not shown).

The present invention therefore converts a signal which began as a horizontal motion detection signal to a vertical motion detector signal.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims. For instance, additional shift registers and AND gates could be added in the sequence to increase the number of vertically adjacent motion flags needed to initiate an alarm. Furthermore, it is possible to arrange shift registers so that they add to the alarm requirement but do not themselves produce an alarm signal.

What is claimed as new and for which Letters Patent of the U.S. are desired to be secured is:

1. A vertical motion detector for a TV system comprising:

horizontal motion detector means generating horizontal motion signals indicating that horizontal motion has occurred on a TV display which the horizontal motion detector means is monitoring, said horizontal signals being produced on the output of said horizontal motion detector means as portions of a series of signal samples which represent elements of the TV display;

a shift register circuit comprising at least one shift register with an output, and with an input of said at least one shift register connected to the output of the horizontal motion detector means, each of said shift registers having the same number of locations within it as there are information samples available from the horizontal motion detector means to represent one horizontal line of the TV display which the horizontal motion detector means is monitoring;

clock signal means synchronized with the signal samples on the output of the horizontal motion detector means and connected to each shift register of said shift register circuit to produce one change of position in each shift register signal for every signal sample on the output of the horizontal motion detector means; and an AND gate circuit comprising at least one AND gate with inputs of said at least one AND gate connected to the output of the horizontal motion detector means and the output of a shift register of the shift register circuit, the output of said at least one AND gate producing a signal indicating vertical motion whenever the horizontal motion detector means generates a motion signal on its output simultaneous with an output signal from the shift register to which said at least one AND gate is connected.

2. The vertical motion detector of claim 1 wherein the horizontal motion detector means is a circuit including a memory and wherein said circuit reduces the number of signal samples representing one horizontal line of the TV display.

3. The vertical motion detector of claim 1 wherein said shift register circuit includes a first and second shift register and wherein the input of the first shift register is connected to the output of the horizontal motion detector means and the input of the second shift register is connected to the output of the first shift register, and the outputs of both shift registers and the horizontal motion detector means are connected to inputs of a reset AND gate.

4. The vertical motion detector of claim 1 wherein said shift register circuit includes at least two shift registers in series, with the output of each shift register connected to the input of the following shift register.

5. The vertical motion detector of claim 1 wherein said AND gate circuit includes first, second and third AND gates, and said shift register circuit includes first through eighth shift registers in series, with the output of each shift register connected to the input of the next higher number shift register;

one of each of the inputs of the first AND gate connected to the output of the horizontal motion detector means, the output of the first shift register, the output of the second shift register and the output of the third shift register;

one of each of the inputs of the second AND gate connected to the outputs of the first AND gate, the fourth shift register, and the fifth shift register;

one of each of the inputs of the third AND gate connected to the outputs of the second AND gate, the sixth shift register, the seventh shift register, and the eighth shift register; and the output of each of the three AND gates connected to a signal selection means which can select which of the three outputs is used for the vertical motion detector output signal.

6. The vertical motion detector of claim 3 wherein the horizontal motion detector means is a circuit including a memory, and the output of the reset AND gate is connected to the memory clear circuit of said memory.

* * * * *